United States Patent [19]

Wojcik

[11] 4,098,982
[45] Jul. 4, 1978

[54] CATIONIC POLYMERIZATION OF PIPERYLENE USING AS THE CATALYST SYSTEM AN ALUMINUM HALIDE AND AN INORGANIC PHOSPHORIC ACID

[75] Inventor: Ronald Thomas Wojcik, Stamford, Conn.

[73] Assignee: Arizona Chemical Company, Wayne, N.J.

[21] Appl. No.: 775,503

[22] Filed: Mar. 8, 1977

[51] Int. Cl.$^2$ .......................... C08F 4/00; C08F 36/04
[52] U.S. Cl. .......................................... 526/233; 260/5; 260/887; 260/889; 260/890; 260/892; 526/308; 526/335; 526/337
[58] Field of Search ................ 526/233, 335, 308, 337

[56] References Cited

U.S. PATENT DOCUMENTS

| 2,060,871 | 11/1936 | Ipatieff .................................. 526/233 |
|---|---|---|
| 3,784,587 | 1/1974 | Chambers ........................ 260/876 B |
| 3,895,081 | 7/1975 | Aikawa et al. ........................ 526/335 |

OTHER PUBLICATIONS

Tindall, Chem. Abs. 70, (1969), p. 48446x.
Komai et al., Chem. Abs. 83, (1975), p. 60310z.

*Primary Examiner*—Harry Wong, Jr.
*Attorney, Agent, or Firm*—Harry H. Kline

[57] ABSTRACT

There is provided a process for cationically polymerizing piperylene batchwise or continuously by the addition of piperylene either alone or in admixture with a minor amount of at least another hydrocarbon monomer, incrementally, to a catalyst system consisting essentially of a major amount of an aluminum halide and a minor amount of an inorganic phosphorus acid in an inert solvent while controlling the temperature of reaction in the range of 0° C. to 50° C., drowning the polymerization mixture in water, separating the organic phase therefrom, then removing the solvent and recovering a solid polymer in good color and yield, free from an intractable gel, rendering the same useful as a tackifying resin.

7 Claims, No Drawings

CATIONIC POLYMERIZATION OF PIPERYLENE USING AS THE CATALYST SYSTEM AN ALUMINUM HALIDE AND AN INORGANIC PHOSPHORIC ACID

The present invention relates to a method for polymerizing piperylene to obtain a polymer free from an intractable gel in good color and yield. More particularly, it relates to a method for polymerizing piperylene either alone or in admixture with at least another hydrocarbon monomer utilizing a catalyst system consisting essentially of a major amount of an aluminum halide and a minor amount of an inorganic phosphorus acid to obtain a piperylene polymer or copolymer, having a softening point of at least 85° C. and possessing a relatively high molecular weight, in good color and yield.

As is known, piperylene has been subjected to copolymerization utilizing carbocationic catalyst systems loosely referred to as Friedel Crafts catalysts, such as aluminum chloride or aluminum chloride, attention being directed to U.S. Pat. Nos. 3,541,188 and 3,577,398. However, polymerization of a piperylene with a carbocationic catalyst absent a modifying monomer as for example 2-methyl-2-butene, results in a mixture of resin and a gel which is intractable and totally unusable as a tackifying resin. If a process could be provided, whereby light colored, tackifying resins free from intractable gel are produced, such a process would fulfill a need long sought for in the art.

It is, therefore, a principal object of the invention to provide a straightforward process for polymerizing piperylene alone or in admixture in major amounts with other hydrocarbon monomers. It is a further object to polymerize or copolymerize piperylene utilizing a catalyst system comprising an aluminum halide and an inorganic phosphorus acid to obtain a polymer free from gelation in economically attractive yields and cost. It is a still further object to prepare a high softening point resin of color hitherto unavailable from corresponding monomers which have not been previously dried to remove water therefrom. Other objects and advantages will become apparent from a reading of the ensuing description.

To this end, it has been found that either piperylene or mixtures of piperylene and other hydrocarbon monomers, can be polymerized in a straightforward manner to obtain corresponding homo- or co-polymers in economically attractive yields. Unexpectedly, a catalyst system consisting essentially of an aluminum halide and an inorganic phosphorus acid is utilized during polymerization.

According to the process of the invention, piperylene alone or in conjunction with other hydrocarbon monomers is subjected to cationic polymerization in the presence of a catalyst system mixture consisting essentially of a major amount of aluminum chloride or bromide and a minor amount of an inorganic phosphorous acid. In general, there is initially prepared a slurry of the aforementioned catalyst system in an inert solvent. Monomer, such as piperylene, is then added incrementally with vigorous stirring, while maintaining the reaction mixture at from about 0° C. to about 50° C. to insure maximum yields of resin of high softening point with accompanying good color, and free from an intractable gel. After the monomer has been added, stirring and cooling are continued for at least fifteen minutes or until the amount of unreacted monomer is substantially reduced. Thereafter, the mixture is stirred at ambient temperature over a period of one to four hours. The reaction mixture is quenched with water or dilute acid or dilute base with the production of an organic phase and an aqueous phase. Resultant polymer is then recovered as a residue after removal of the organic solvent, as by steam distillation, or if applicable, can be used in the solvent solution.

As the monomer which can be employed in the process of the invention, there is mentioned cis-piperylene and trans-piperylene. If desired, mixtures of a piperylene containing at least 60%, by weight, of the same and cyclopentene can also be employed herein. An illustrative monomeric mixture of the latter comprises 79% cis- and trans-piperylene, 13.5% cyclopentene and the balance being isoprene and dicyclopentadiene. Another preferred monomeric mixture comprises a piperylene feed stream obtained as by-product materials during petroleum refining and processing. The latter represents a potential inexpensive diolefin monomer. The composition varies in relation to the petroleum operation. A representative piperylene stream contains 10–20% cis-piperylene, 50–80% trans-piperylene and various amounts of unsaturated hydrocarbons of similar boiling points, such as cyclopentene, 1–3% of isoprene and trace amounts of other $C_5$ olefins. For purposes of the instant invention, a piperylene stream containing about 80% of the polymerizable olefins as cis- and trans-piperylene is preferred.

In general, the overall catalyst system comprises two principal components. As hereinabove stated, the system comprises an aluminum halide, such as aluminum chloride or aluminum bromide and an inorganic phosphorus acid, such as phosphoric acid (85%–100%), meta phosphoric acid and phosphorous acid (85%). A preferred acid is phosphoric acid as an 86% solution.

It is a good practice to employ a wide range of the aforementioned catalyst system during polymerization. Usually, between two (2) and twelve (12) weight percent of the catalyst system, based on the overall amount of monomer, is used. The catalytic system consists essentially of (a) 70% to 85% of aluminum chloride or bromide, and (b) 30% to 15% of phosphoric acid. A good operating range of catalyst components is 2 to 4 parts of aluminum chloride, and from 0.7 to 1.4 part of phosphoric acid (86% concentration), per 100 parts of monomer, and parts being by weight.

Exemplary inert solvents or diluents herein employed include p-xylene, chlorobenzene, or o-dichlorobenzene and mixtures of the same.

Advantageously, in the production of high yields of high softening point resin which characterizes the resin of the present invention, both the piperylene reactant and the inert solvent can be utilized without the removal of water therefrom. For instance, it is known that an aromatic solvent containing as much as 400 ppm water and the monomer containing as much as 200 ppm water can be used in polymerization. Greater amounts of water, however, cannot be tolerated without concomitant reductions in yields of polymer. Alternatively, if desired, the solvent and monomer can be dried prior to reaction by azeotropic removal of water or their passage through a drying agent.

In a preferred practice of the invention piperylene and solvent are each employed undried, that is, with from and solvent are each employed undried, that is, with from about 100 and 300 ppm of detectable water, respectively. The overall system is next flushed out with an inert gas, suitably nitrogen. The solvent and catalyst system are introduced into the dry vessel and piperylene is then added incrementally and progressively, for instance, in dropwise fashion, while the reaction medium is stirred vigorously. As soon as the piperylene addition begins, and exotherm occurs and cooling is applied to maintain the reaction mixture at from 0° C. to 40° C. Stirring and temperature control at this level are continued for a period of time, generally 30 minutes, after all of piperylene had been added. Some fifteen minutes to four hours suffice for the latter purpose. Thereafter, the reaction mixture is allowed to stir for a period of from one to four hours at ambient temperature. Normally, reaction is continued until essentially all monomer is converted.

At the end of this time, the reaction medium is quenched to inactivate the catalyst system, as by adding a volume of water equal to the volume of piperylene monomer used. If desired, there may be used a dilute solution of an acid, such as hydrochloric acid or of a base instead of water. In either case, there are formed two layers, one of which constitutes a hydrocarbon phase and the other is an aqueous phase. The layers are separated and the hydrocarbon phase is washed repeatedly with water until neutral.

In order to facilitate a further understanding of the invention, the following examples are presented primarily for purposes of illustrating certain more specific details thereof. The invention is not to be deemed limited thereby except as defined in the claims. Unless otherwise noted, the parts and percentages are by weight.

EXAMPLE 1

To a nitrogen blanketed three-neck flask are introduced 300 parts of p-xylene and there are next added 9 parts of aluminum chloride, followed by 1.5 parts (by volume) of phosphoric acid (86%). The resultant mixture is vigorously stirred while maintaining the temperature at 40° C. to 45° C. 600 Parts of a mixture consisting of 79% cis- and trans-piperylene, 13.5% cyclopentene, and the balance of the mixture containing isoprene and dicyclopentadiene are then introduced over a period of 25 minutes. The temperature of reaction mixture is held at 40° C. during monomer addition and thereafter the contents of the flask are maintained in an inert nitrogen atmosphere at this temperature for one-half hour. There is next added water equal in volume to the piperylene mixture used, to inactivate the catalyst system, and to cause separation of the aqueous and organic phase. Following separation of the organic phase it is washed with water until neutral. It is then charged to a suitable flask provided with a heater, thermometer and nitrogen atmosphere, and the temperature gradually raised to 210° C., thereby removing the volatile solvent. The introduction of nitrogen is discontinued and in its place steam is passed in and the temperature raised to 215° C. Steaming is continued until the resin softening point reaches the desired limit. Application of vacuum removes any trace of moisture and the molten resin free from intractable gel is obtained in 99% yield and having:

| | |
|---|---|
| Softening point | 96° C., ring and ball |
| Color | Gardner 7 |
| Molecular Weight | 1200 |

Substituting phosphorus acid (85%) for phosphoric acid (86%), in the above, similar results are obtained.

EXAMPLE 2

Repeating Example 1 in every detail except that dry piperylene (50 ppm water) is employed and monochlorobenzene (40 ppm water) are substituted for p-xylene. A yield of 80.4% of resin having a softening point of 128° C. and a Gardner color of 7 is obtained.

Substituting metaphosphoric acid for $H_3PO_4$ and o-dichlorobenzene for monochlorobenzene in the above example, there is obtained a 115° C. resin in 86.5% yields and comparable color.

EXAMPLE 3

This example illustrates the continuous polymerization of piperylene.

To a suitable reaction vessel equipped with stirrer, gas inlet, dropping funnels, screw feeder for aluminum chloride, overflow tube and thermometer are added 85 ml of dry p-xylene followed by the addition of 3 g. of anhydrous $AlCl_3$ and 0.9 ml of phosphoric acid. Then, 100 g of piperylene monomer is metered into resultant slurry over a 10 minute interval, while maintaining the temperature at 40° C. This fills the reactor to the overflow tube. The continuous phase of the polymerization is then carried out by simultaneous proportionate metering to the reactor of the following: (a) a solution of 800 g. piperylene in 665 ml p-xylene, (b) a solution of 7.5 ml of phosphoric acid in 200 ml p-xylene and (c) 24 g. of solid aluminum chloride. During the continuous phase of the polymerization, the reaction mixture is draining into a first reservoir flask which is maintained at 20° C. The contents of this first reservoir flask cascades in sequence into similar reservoir flasks. Finally, the polymerization mixture is permitted to cascade into water, thus effecting deactivation of the catalyst system. For convenience, a fixed amount of deactivated polymerization mixture is isolated and heated to 50° C. and filtered to remove the catalyst fragments. The organic phase is separated, washed once with 5% sodium carbonate and then with water until neutral. The solvent is recovered by distillation and the molten residue steam distilled with water to a pot temperature of 230° C.–235° C. There is then recovered a 94% yield of resin, having a softening point 100° C. and a Gardner color of 6.

EXAMPLE 4

Piperylene resin as prepared in accordance with Example 1 is light in color and shows exceptionally high compatibility with commonly used polymers and film formers. It has the ability to tackify other materials with which it is compatible, such as styrene-butadiene rubber, natural rubber, ethylene-propylene elastomers, chlorobutyl and butyl and butyl rubber by methods well known in the art.

EXAMPLE 5

Polymerized piperylene resin as prepared in the procedure of Example 1 after azeotropic drying but without the removal of solvent therefrom is directly employed in a composition to effect tackification of rubbery materials as shown in Example 4, above.

I claim:
1. A process for polymerizing piperylene monomer or a mixture of said piperylene and at least another hydrocarbon monomer not to exceed 40% of said piperylene which comprises the steps of: establishing a cata- lyst system in an inert solvent therefor, said system comprising (1) a minor amount of from about 15% to about 30% of an inorganic phosphorus acid and (2) a major amount of from about 70% to about 85% of aluminum chloride or aluminum bromide or mixtures of aluminum chloride and aluminum bromide, adding thereto at a temperature between about 0° C and about 50° C piperylene monomer or a mixture of piperylene and other hydrocarbon monomers not to exceed 40% of said piperylene incrementally with agitation, adjusting and maintaining the temperature of said mixture between 0° C and 50° C for from about 1 to about 4 hours to obtain a piperylene polymer free from intractable gel.

2. A process for polymerizing piperylene monomer or a mixture of piperylene and at least another hydrocarbon monomer according to claim 1 which comprises the steps of: establishing a catalyst system comprising (1) a minor amount of phosphoric acid, (2) a major amount of aluminum chloride or aluminum bromide or mixtures of the two in an inert solvent, adding thereto at a temperature between about 0° C. and 50° C. piperylene monomer or a mixture of piperylene and at least another hydrocarbon monomer incrementally with agitation, adjusting and maintaining the temperature of said mixture at 0° C. and 50° C. for from about one to about four hours, quenching the latter mixture with an aqueous solution to obtain a piperylene resin-solvent solution, filtering any insolubles therein, separating resultant aqueous phase from the piperylene resin solvent solution, and recovering a solid polymer therefrom free from intractable gel.

3. The process according to claim 1 wherein the inert solvent and piperylene monomer in admixture contains from about 100 ppm to about 400 ppm water.

4. The process according to claim 1 wherein the mixture of piperylene and at least another hydrocarbon monomer comprises 79% cis- and trans-piperylene and 13.5% cyclopentene.

5. The process according to claim 2 wherein the catalyst system comprises from about 70% to about 85% aluminum chloride and from about 30% to 15% of phosphoric acid and wherein the overall amount of catalyst used ranges between about 2% and 12%, of said monomer, said percentages being by weight.

6. The process according to claim 1 wherein the process is carried out batchwise.

7. The process according to claim 2 wherein the process is carried out continuously.

* * * * *